United States Patent

[11] 3,618,881

| [72] | Inventors | Walter E. Fellers<br>Los Angeles;<br>Leon F. Begin, Pasadena; Michael G. Huben, Los Angeles, all of Calif. |
|---|---|---|
| [21] | Appl. No. | 846,363 |
| [22] | Filed | July 31, 1969 |
| [45] | Patented | Nov. 9, 1971 |
| [73] | Assignee | Northrop Corporation<br>Beverly Hills, Calif. |

[54] COCKPIT ENCLOSURE
2 Claims, 4 Drawing Figs.

| [52] | U.S. Cl. | 244/121 |
|---|---|---|
| [51] | Int. Cl. | B64c 1/14 |
| [50] | Field of Search | 244/121 |

[56] References Cited
UNITED STATES PATENTS

| 3,139,721 | 7/1964 | Daubenspeck | 244/121 |
| 2,318,909 | 5/1943 | Woods | 244/121 |
| 2,345,336 | 3/1944 | Fox | 244/121 |
| 2,385,684 | 9/1945 | Burton et al. | 244/121 |
| 2,716,529 | 8/1955 | Czerwinski | 244/121 |
| 2,998,212 | 8/1961 | Rogers, Jr. | 244/121 |

*Primary Examiner*—Milton Buchler
*Assistant Examiner*—Steven W. Weinrieb
*Attorneys*—Harold L. Fox and Willard M. Graham

ABSTRACT: A cockpit enclosure or canopy assembly for aircraft including a canopy comprising fore and aft portions and a platelike protective shield constituting armor glass. The forward portion and protective shield constituting primary and emergency windshields, respectively, of the canopy assembly. The protective shield also functioning as a combining glass for head-up display or like equipment. The shield and canopy assembly cooperating to insure maximum visibility, improved aerodynamic features, reduces clutter and improves neatness etc., of the canopy area.

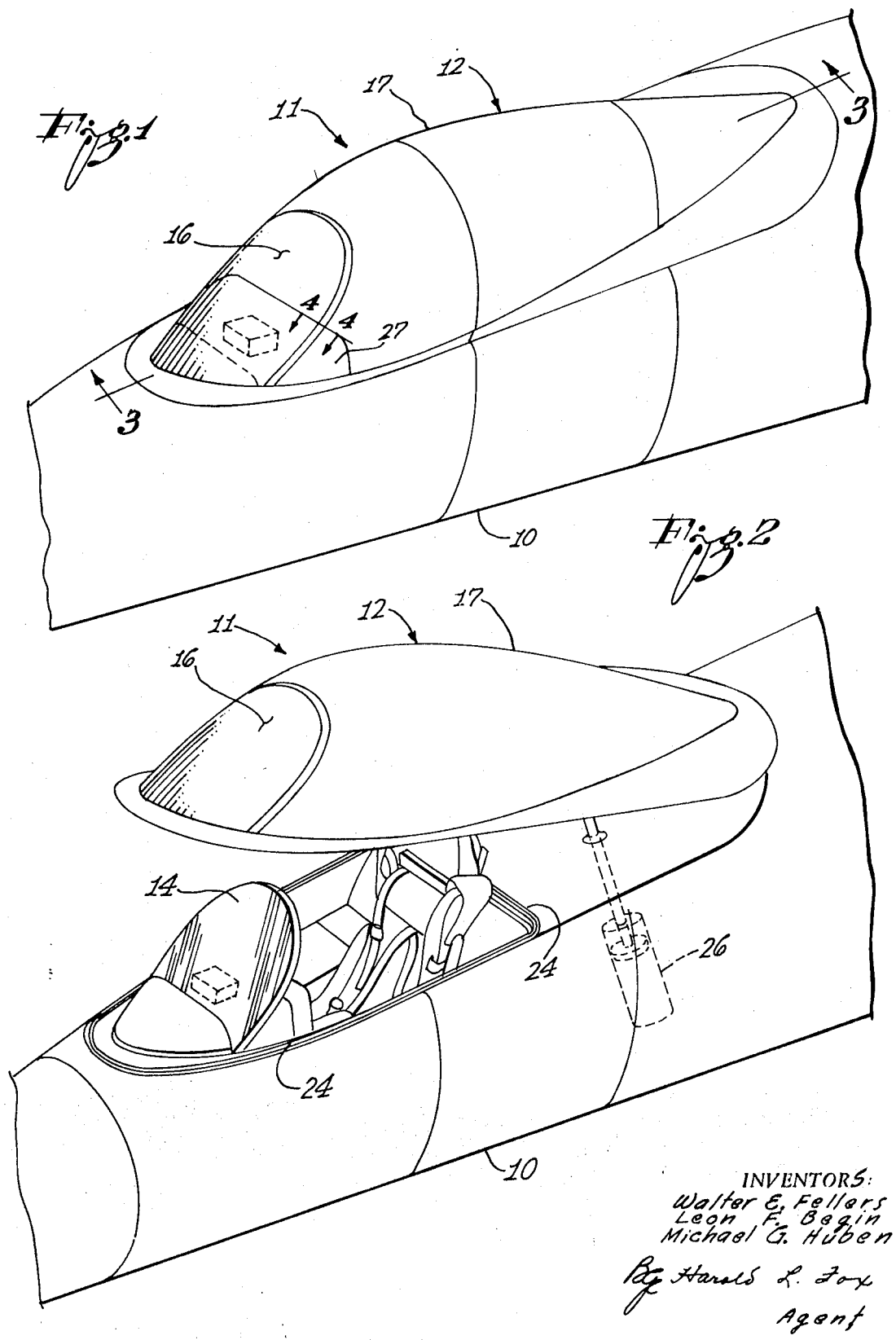

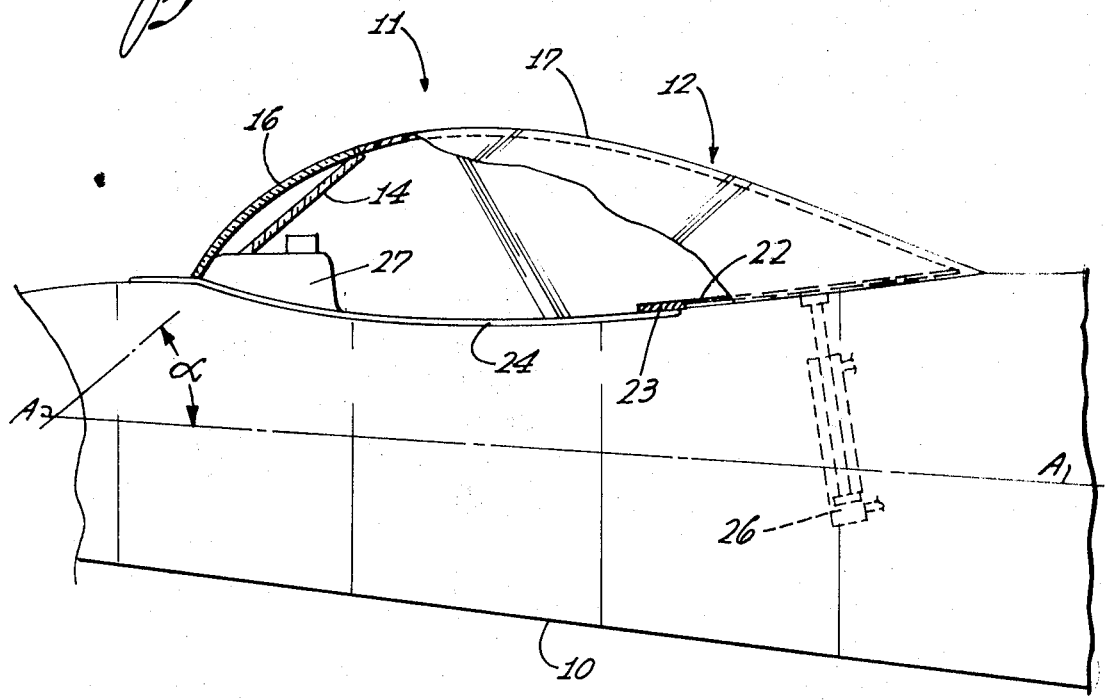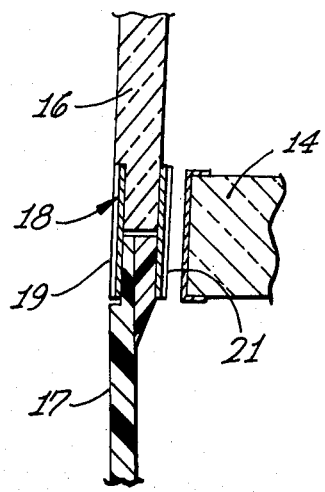

COCKPIT ENCLOSURE

The present invention pertains generally to aircraft canopies and more particularly to cockpit enclosures and associated components for fighter and attack-type aircraft.

To the best of applicant's knowledge no outstanding advances have been made in recent years in the design and construction of canopies or cockpit enclosures for aircraft, the foregoing is especially true in connection with the design and construction of canopy assemblies for attack or fighter type aircraft.

Briefly, the present cockpit enclosure assembly is constructed—for the most part—of transparent sheet or plate material and provides a structure of streamlined configuration at such time as the structure has a lower relation with respect to the aircraft on which it is mounted. The present canopy is of elongated configuration consisting of fore and aft portions, the forward portion constituting the primary or principal windshield of the canopy. Frame means, offering improved visibility and negligible aerodynamic (air) resistance, secures the fore and aft portions together in fixed relation whereby the canopy may be actuated between raised and lowered positions with respect to the aircraft on which it is mounted. Associated with the canopy is a sheet or plate of armor glass which functions as an auxiliary or emergency windshield to provide additional protection for the operator (pilot) of the aircraft and also as a combining glass for head-up display equipment explained as the disclosure progresses.

An object of the present invention is to provide a cockpit enclosure assembly for fighter and attack type aircraft improving visibility with respect to conventional cockpit assemblies.

Another object is to provide a cockpit enclosure assembly for fighter and attack-type aircraft having improved aerodynamic characteristics with respect to conventional cockpit enclosures.

Another object is to provide a cockpit enclosure assembly for fighter and attack-type aircraft which includes an auxiliary windshield providing additional protection for an operator (pilot) of the aircraft on which the assembly is mounted and also functioning as a combining glass for head-up display equipment thereby materially reducing congestion in the cockpit area.

Another object is to provide a cockpit enclosure assembly for fighter and attack-type aircraft in which the canopy consists of at least two portions rigidly secured together in fixed relation whereby the canopy may be actuated between raised and closed positions with respect to an aircraft on which it is mounted.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGS. 1 and 2 constitute perspective views of the cockpit enclosure assembly as disclosed herein in the open and closed positions thereof, respectively, as mounted on an aircraft.

FIG. 3 is a sectional view, partially inside elevation of the assembly of FIG. 1, the view being taken on the line 3—3 of the latter figure.

FIG. 4 is a sectional view of the frame member taken on the line 4—4 of FIG. 1, the view also illustrating the relation of the secondary or protective windshield with respect to the main or principal windshield.

Referring to the drawings, the cockpit enclosure assembly 11 as disclosed herein is shown in FIGS. 1-3, inclusive, as mounted on an attack or fighter aircraft 10. Principal components of the assembly 11 include a canopy or cockpit enclosure 12 and an auxiliary windshield 14.

The canopy per se 11 is of elongated configuration constructed for the most part of shaped transparent sheet material, for example—stretched or shaped acrylic materials etc. The sheet material of which the canopy is constructed is shaped or cast to provide a structure substantially as shown in FIGS. 1-3, inclusive. The canopy is further characterized in that it includes fore and aft sections 16 and 17, respectively.

The fore and aft sections 16 and 17 are rigidly secured together by means of a splice joint 18 substantially as shown in FIG. 4. The joint 18 includes a pair of rigid strips 19 and 21 having an opposing relation in which the shaped plates 16 and 17 are secured therebetween. The plates 16 and 17 are indented to receive the strip 19 in flush relation with respect to the plates 16 and 17 and thus insure that the joint 18 will offer negligible aerodynamic (air) resistance. A suitable adhesive and fasteners are utilized to secure the plates 16 and 17 and strips 19 and 21 together in fixed relation.

By referring to FIG. 2 it will be seen that pneumatic sealing tube 24 surrounds the periphery of the cockpit compartment and crosses from one side thereof to the other directly aft of the pilot's seat. The sealing tube 24 functions to seal the canopy 12 and renders it fluidtight in a manner to be explained presently. The sealing tube 24 is located in a substantially horizontal plane and is free of any sharp angular bends.

A substantially horizontal deck 22, preferably constructed of metal or other rigid material, covers the lower aft portion of the canopy 12 substantially as shown in FIG. 3, the joint between the deck and the canopy 12 being fluidtight. Referring further to FIG. 3, the forward end of the deck 22 terminates in a sill-like member 23 adapted to bottom or bear on the tube 24. The outer end of an actuator 26, mounted in the aircraft 10, adapted to pivotally bear on the deck 22 functions to actuate the canopy between its raised and lowered positions shown in FIGS. 1 and 2, respectively. Bearings (not shown) are provided adjacent the aft end of the canopy 12 and allow movement thereof between the raised and lowered positions described above.

By referring to FIG. 2 it will be seen that the seal 24 contains no abrupt or sharp turns throughout its extent. Further, the member 23 bottoms on the seal 24, accordingly the canopy 12 is rendered fluidtight for obvious reasons at such times as the sill member is bottomed on the seal 24 and the latter inflated.

The aforementioned auxiliary windshield 14 is fixedly secured to the cowling 27 of the aircraft 10. As previously mentioned the auxiliary windshield constitutes a plate of armor glass, the curved periphery of which is positioned adjacent the splice joint 18. So positioned it has an angular relation (angle $\alpha$) with respect to the longitudinal axis A—A of the aircraft 10 as shown in FIG. 3, also it has a normal relation with respect to the vertical plane containing the axis A—A of the aircraft.

Thus, as previously mentioned, it will be seen the curved edge of the plate 14 is located adjacent the splice joint 18 and therefore visibility is not significantly impared. Primarily the plate 14 functions to protect an operator (pilot) of the aircraft 10, a missile which may penetrate the principal windshield 16 will be further retarded, in fact its forward progress may be completely arrested, by the auxiliary windshield 14. The auxiliary windshield also functions to protect an operator (pilot) of the aircraft 10 in the event the canopy 12 is lost during enemy action or is jettisoned for any other reason.

The plate 14 also functions as a combining glass for head-up display apparatus such as a gun sight or the like of the type shown and described in U.S. Pat. No. 3,423,155. The combining glass and the structure holding the same will be replaced by the plate 14. Substitution of the plate 14 for comparable components of the sight (U.S. Pat. No. 3,423,155) relieves congestion and clutter in the cockpit area.

Thus it will be seen that a cockpit enclosure assembly, functioning to provide the various objects of the invention set forth above is disclosed.

We claim:

1. In an aircraft, a forward portion of the fuselage thereof defining a cockpit compartment, comprising:
   an elongated shell-like structure of streamlined configuration symmetrically constructed with respect to the longitudinal axis thereof and including a transparent forward portion joined to an aft portion forming the balance of said covering and a peripheral edge portion,
   a deck member hermetically sealed to the peripheral edge portion at the aft portion of said structure, said structure being mounted on said aircraft fuselage for pivotal movement between raised and lowered positions in which said peripheral edge portions are bottomed on said aircraft fuselage and spaced therefrom respectively, an actuator having movable and nonmovable ends adapted to move said structure between said raised and lowered positions, inflatable sealing tubes both on the aircraft fuselage directly under the peripheral edges of said forward portion and directly aft of the cockpit compartment, the sealing tubes aft of the cockpit compartment being positioned directly below the forward portion of the deck member, said sealing tubes rendering the structure fluidtight when the structure is in its lowered position and said tubes are inflated, the nonmovable end of said actuator being fixedly secured to said aircraft fuselage and the movable end of said actuator being pivotally secured to the lower surface of the deck member at a location aft of said sealing tubes, and an auxiliary windscreen fabricated of a plate of armor glass having a major plane surface and being fixedly secured to the main structure of said aircraft fuselage and structurally independent of said shell-like structure, said auxiliary windscreen being positioned within the shell-like structure when said last-mentioned structure is in its lowered position, the major plane surface of said auxiliary windscreen being canted at a predetermined angle with respect to the longitudinal axis of said fuselage, such that its upper edge is located aft of its lower edge, thereby enabling use thereof as a combining glass as well as to provide protection for the pilot of the aircraft.

2. The cockpit compartment of claim 1, wherein the periphery of said auxiliary windscreen is located substantially opposite the joinder interface of the forward and aft portions of said shell-like structure.

* * * * *